(12) United States Patent
Gollier et al.

(10) Patent No.: US 7,773,293 B2
(45) Date of Patent: Aug. 10, 2010

(54) WAVELENGTH CONVERSION DEVICES HAVING MULTI-COMPONENT OUTPUT FACES AND SYSTEMS INCORPORATING THE SAME

(75) Inventors: Jacques Gollier, Painted Post, NY (US); James Andrew West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 120 days.

(21) Appl. No.: 12/200,613

(22) Filed: Aug. 28, 2008

(65) Prior Publication Data

US 2010/0053571 A1     Mar. 4, 2010

(51) Int. Cl.
 G02F 1/35   (2006.01)
 G02F 2/02   (2006.01)
 G02B 6/10   (2006.01)
 G02B 6/12   (2006.01)

(52) U.S. Cl. .................. 359/332; 359/326; 385/14; 385/122; 385/131; 385/132; 372/22

(58) Field of Classification Search ......... 359/326–332; 385/14, 122, 129–132; 372/22
See application file for complete search history.

(56) References Cited

U.S. PATENT DOCUMENTS

| | | | |
|---|---|---|---|
| 5,619,369 A | 4/1997 | Yamamoto et al. | 359/332 |
| 5,909,456 A | 6/1999 | Oka | 372/22 |
| 5,970,077 A | 10/1999 | Hill | 372/23 |
| 6,181,461 B1 | 1/2001 | Wada et al. | 359/326 |
| 2004/0233512 A1* | 11/2004 | Fujioka et al. | 359/326 |
| 2006/0165138 A1 | 7/2006 | Kachanov et al. | 372/21 |
| 2007/0237481 A1 | 10/2007 | Yoshino et al. | |
| 2009/0190624 A1* | 7/2009 | Almoric et al. | 372/107 |
| 2009/0219954 A1 | 9/2009 | Gollier | |

FOREIGN PATENT DOCUMENTS

| | | |
|---|---|---|
| JP | 2005069984 | 3/2005 |
| JP | 2007183316 | 7/2007 |

* cited by examiner

*Primary Examiner*—Daniel Petkovsek
(74) *Attorney, Agent, or Firm*—Kwadjo Adusei-Poku

(57) ABSTRACT

The present invention relates generally to wavelength conversion devices and laser projection systems incorporating the same. According to one embodiment of the present invention, wavelength conversion devices are provided without limitation of their field of use to laser projection systems. For example, the wavelength conversion device may comprise an axial waveguide portion and a pair of lateral planar waveguide portions confined between a pair of relatively low index cladding layers. The effective index of refraction in the axial waveguide portion of the waveguide region and the effective index of refraction in the lateral planar waveguide portions of the waveguide region are established such that the relatively low intensity laterally distributed parasitic light is characterized by a scattering angle $\theta$ that is at least as large as the beam divergence angle of the relatively high intensity light propagating in the axial waveguide portion.

17 Claims, 4 Drawing Sheets

WAVELENGTH CONVERSION DEVICES HAVING MULTI-COMPONENT OUTPUT FACES AND SYSTEMS INCORPORATING THE SAME

BACKGROUND OF THE INVENTION

The present invention relates generally to semiconductor lasers and, more particularly, to planar waveguide wavelength conversion devices and laser projection systems incorporating such conversion devices.

SUMMARY OF THE INVENTION

The present invention relates generally to semiconductor lasers, wavelength conversion devices, and the other optical components that can be used in laser projection systems including a short wavelength source. Short wavelength sources can be configured for use in a laser projection system by combining a single-wavelength semiconductor laser, such as, for example, a distributed feedback (DFB) laser, a distributed Bragg reflector (DBR) laser, or a Fabry-Perot laser, with a wavelength conversion device, such as, for example, a second harmonic generation (SHG) crystal, or other types of second or higher-order conversion devices. In the case of an SHG crystal, it can be configured to generate higher harmonic waves of the fundamental laser signal by tuning, for example, a 1060 nm DBR or DEB laser to the spectral center of an SHG crystal, such as, for example, MgO-doped periodically poled lithium niobate (PPLN), which converts the wavelength to 530 nm. It is contemplated that wavelength conversion devices for use in the context of the present invention may comprise PPLN SHG crystals, other types of conventional or yet to be developed SHG crystals, or any other type of conventional or yet to be developed wavelength conversion device. For example, alternative second harmonic generating materials include, for example, conventional or yet-to-be developed non-linear optical materials, photonic crystal slabs, chiral materials, etc.

The output of the wavelength conversion device can be influenced significantly by parasitic light generated as the fundamental signal propagates through the waveguide region of the wavelength conversion device 10. More specifically, referring to FIGS. 1 and 2, the geometrical configuration of the wavelength conversion device 10 according to the present invention defines a waveguide region 12 comprising a relatively thin layer of periodically poled LiNbO$_3$ (PPLN), or some other suitable second harmonic generating material, and two low index cladding layers 14, between which the thin layer of PPLN is sandwiched. In some embodiments, the wavelength conversion device 10 is assembled by attaching low index cladding layers 14 to respective blocks of LiNbO$_3$.

Two low index optical trenches 16 are disposed on opposite sides of an axial waveguide portion 12A and extend between the input face 11 and the output face 13 of the device 10 along the propagating direction and guide the propagating signal in the axial waveguide portion 12A of the waveguide region 12 by helping to confine propagating modes into the axial waveguide portion 12A and limit propagation in the lateral planar waveguide portions 12B of the waveguide region 12. As is illustrated in FIGS. 1 and 2, the layer of second harmonic generating material and the pair of relatively low index cladding layers 14 extend laterally so as to span the axial waveguide portion 12A and the pair of lateral planar waveguide portions 12B across the entire width of the wavelength conversion device 10. However, in practicing the present invention, it may be suitable to merely ensure that the layer of second harmonic generating material extends approximately 3 to 10 µm laterally into each the pair of lateral planar waveguide portions 12B, although other dimensions would also be functional. Generally, for ease of manufacture, the SHG material will extends throughout the entire width of the device but will only generate a useful SHG signal in the phase-matched or poled region. In other regions the SHG is not efficient and does not perform significant wavelength conversion.

The relatively low index optical trenches 16 can be spaced on opposite sides of the axial waveguide portion 12A and can extend at least about 50% or at least about 2 µm into the thickness dimension of the second harmonic generating material. The general wedged-shaped geometry of the trench is illustrated in FIG. 2 but it is contemplated that a variety of alternative geometries and dimensions would be functional. Typically, the dimensions of the axial waveguide portion 12A along its central axis are on the order of a few microns in the vertical direction and less than ten microns in the lateral direction, although dimensional variations from these references are contemplated.

The present inventors have recognized that light propagating in the axial waveguide portion 12A is typically subject to significant scattering. As is illustrated in FIG. 2, most of this stray light escapes from the axial waveguide portion 12A but remains mostly trapped in the pair of lateral planar waveguide portions 12B. As a consequence, as is illustrated schematically in FIG. 2, the near field of the wavelength conversion device comprises a bright emitting spot 15 made of the light that propagated along the axial waveguide portion 12A without significant scattering and laterally distributed parasitic light 17 consisting of the light that has been scattered and trapped in the lateral planar waveguide portions 12B.

The shape of the stray light 17 depends upon the manner in which light propagates in the wavelength conversion device 10. When an optical signal propagating along the axial waveguide portion 12A is scattered, part of the light is transferred to the lateral planar waveguide portions 12B of the waveguide region 12 where the propagating modes are much less confined. The effective index of refraction $n_{EFF}(B)$ in the lateral planar waveguide portions 12B effectively defines one preferential angle $\theta$ at which all scattered waves are in phase. This angle $\theta$ is given by the following relation;

$$\cos\theta = n_{EFF}(A)/n_{EFF}(B)$$

where $\theta$ is the scattering angle, $n_{EFF}(A)$ is the effective index in the axial waveguide portion 12A of the waveguide region 12, and $n_{EFF}(B)$ is the effective index in the lateral planar waveguide portions 12B of the waveguide region 12.

As a result of this scattering, the present inventors have recognized that the typical far field of wavelength conversion devices 10 comprising the axial and lateral planar waveguide portions 12A, 12B includes a few well-defined lateral intensity peaks, each corresponding to the scattering angles of the modes supported by the axial waveguide region 12A. These lateral intensity peaks can disrupt the performance of many laser projection systems. The present inventors have recognized potentially beneficial schemes for reducing the impact of these lateral intensity peaks.

According to one embodiment of the present invention, a laser projection system is provided comprising a laser source, a wavelength conversion device, and beam projection optics. The waveguide region of the wavelength conversion device comprises an axial waveguide portion and a pair of lateral planar waveguide portions confined between a pair of relatively low index cladding layers. The waveguide region is structured such that an optical signal propagating from the input face to the output face along the waveguide region will define relatively high intensity light propagating in the axial waveguide portion and will be subject to a degree of scattering to define relatively low intensity laterally distributed parasitic light propagating in the lateral planar waveguide portions. The effective index of refraction $n_{EFF}(A)$ in the axial waveguide portion of the waveguide region, and the effective index of refraction $n_{EFF}(B)$ in the lateral planar waveguide portions of the waveguide region are established such that the relatively low intensity laterally distributed parasitic light is characterized by a scattering angle θ that is at least as large as the beam divergence angle of the relatively high intensity light propagating in the axial waveguide portion. The beam projection optics are structured to discriminate between the laterally distributed parasitic light and the relatively high intensity light so as to favor projection of relatively high intensity optical signals towards an image field of the laser projection system.

According to another embodiment of the present invention, the relatively low index cladding layers comprise at least one modified refractive index portion that is configured to decrease the following ratio $$n_{EFF}(A)/n_{EFF}(B)$$

wherein $n_{EFF}(A)$ is the effective index of refraction in the axial waveguide portion of the waveguide region and $n_{EFF}(B)$ is the effective index of refraction in the lateral planar waveguide portions of the waveguide region.

Wavelength conversion devices are also provided without limitation of their field of use to laser projection systems.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
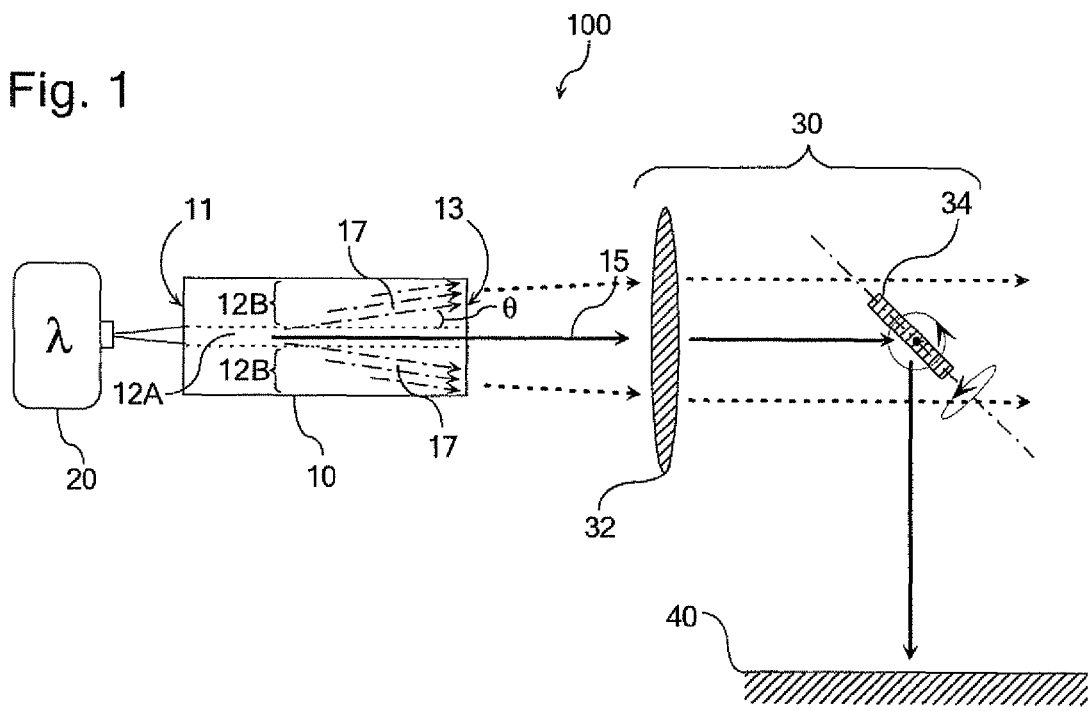
FIG. 1 is a schematic illustration of a laser projection system according to one embodiment of the present invention.
Figure 2:
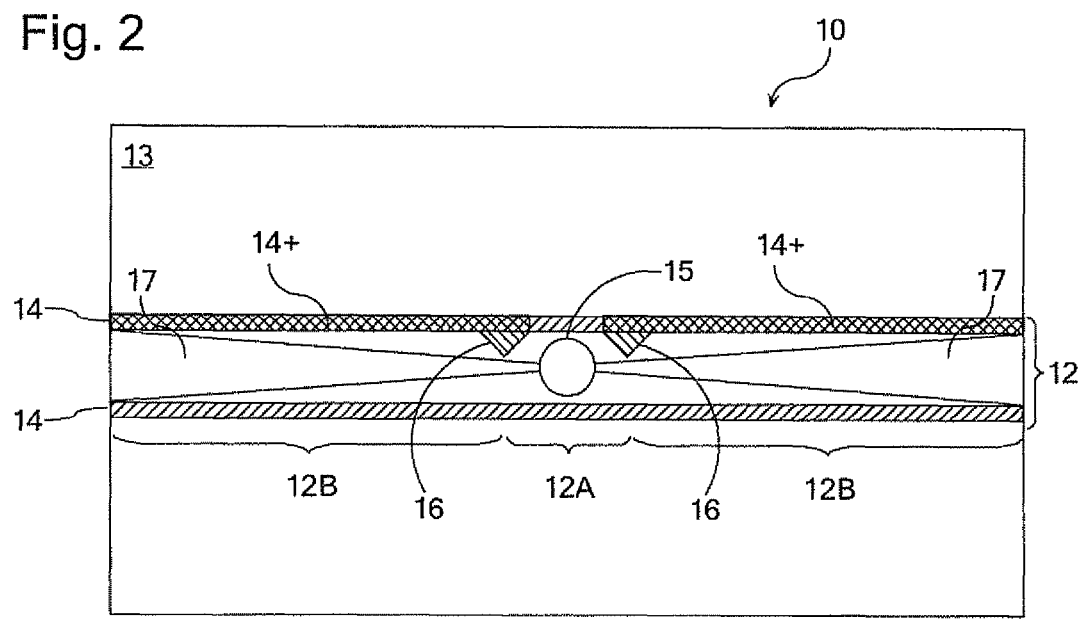
FIGS. 2-6 are schematic illustrations of some of the various wavelength conversion devices according to the present invention.

Referring to FIGS. 1 and 2, the concepts of the present invention may be conveniently illustrated with general reference to a laser projection system 100 comprising a wavelength conversion device 10, a laser source 20, and beam projection optics 30 comprising, for example, a collimating lens 32 and a scanning mirror 34. The laser source 20 may comprise any of a variety of types of semiconductor or non-semiconductor lasers, including those noted above. Similarly, the beam projection optics 30 can embody a variety of scanning and non-scanning optical configurations from the relatively simple to the relatively complex including, for example, a two-axis, gimbal mounted, MEMS scanning mirror 34 configured to cooperate with the laser source to generate a two-dimensional single or multi-color scanned laser image on a projection screen 40 in the image field of the laser projection system 100. It is also contemplated that the beam projection optics can be configured as part of non-scanning optical systems such as spatial light modulator based systems (including digital light processing (DLP), transmissive LCD, and liquid crystal on silicon (LCOS) systems).

The light beam emitted by the semiconductor laser 20 can be either directly coupled into the waveguide of the wavelength conversion device 10 or can be coupled through collimating and focusing optics or some other type of suitable optical element or optical system. The wavelength conversion device 10 converts the incident light into higher harmonic waves and outputs the converted signal. As is noted above, this configuration is particularly useful in generating shorter wavelength laser beams from longer wavelength semiconductor lasers and, as such, can be used as a visible laser source for a single-color laser projection system or for a multi-color RGB laser projection system.

The wavelength conversion device 10 comprises an input face 11, an output face 13, and the aforementioned waveguide region 12 extending from the input face 11 to the output face 13. The relatively thin waveguide region 12 comprises a layer of second harmonic generating material sandwiched between two lower index layers 14 to ensure light confinement in the vertical direction of FIG. 2. The two lower index layers may be formed from any of a variety of waveguide cladding materials, including air. Two optical trenches 16 extend partially into the waveguide region 12 to help confine light in the lateral direction and define an axial waveguide portion 12A of the waveguide region 12. Typically, most of the light emitted by the laser 20 is coupled into and remains confined in the axial waveguide portion 12A. However, as light propagates in the axial waveguide portion 12A, part of it is converted to a higher frequency through non linear optical effects. Roughness and other irregularities and imperfections in the axial waveguide portion 12A generate scattering of the frequency-converted light, which results in some leakage of power from the linear waveguide portion 12A. The low index layers 14 confine most of the light that is scattered into the lateral planar waveguide portions 12B located on both sides of the axial waveguide portion 12A. The resulting near field pattern at the output face 13 of the wavelength conversion device 10 comprises a relatively high intensity spot 15 corresponding to relatively high intensity light that has not been scattered and relatively low intensity laterally distributed light 17 corresponding to scattered or stray light.

One interesting property of the stray light is associated with the fact that light does not propagate at the same speed in the axial waveguide portion 12A and the lateral planar waveguide portions 12B because both waveguide portions have different structures. As a consequence, the stray light is preferentially emitted in one direction corresponding to a scattering angle θ where the stray light is in phase with the light that is propagating into the linear waveguide. The scattering angle θ is given by the following equation:

$$\cos\theta = n_{EFF}(A)/n_{EFF}(B)$$

where θ is the scattering angle, $n_{EFF}(A)$ is the effective index in the axial waveguide portion 12A of the waveguide region 12, and $n_{EFF}(B)$ is the effective index in the lateral planar waveguide portions 12B of the waveguide region 12.

These preferential emission angles result in a far field pattern that comprises a central lobe, resulting from light that is not scattered, in combination with a few lateral lobes, resulting from the scattered light. The fact that more than one single lateral lobe is visible is due to the fact that the waveguide region 12 may sometimes support multiple modes having different effective indices. By taking typical waveguide materials and geometries, the preferential scattering angle is smaller than the angular width of the central lobe. As a result, scattering peaks are superimposed on the otherwise useful central lobe, making it difficult to filter the parasitic light from the useful unscattered light using, for example, spatial filters in the far field of the device.

As is illustrated with further reference to FIGS. 1 and 2, to help alleviate the above-noted problems associated with the laterally distributed parasitic or stray light 17, the effective index of refraction $n_{EFF}(A)$ in the axial waveguide portion 12A of the waveguide region 12 and the effective index of refraction $N_{EFF}(B)$ in the lateral planar waveguide portions 12B of the waveguide region 12 are tailored such that the scattering peaks are not superimposed on the otherwise useful central lobe. One way to achieve this result is to ensure that the relatively low intensity laterally distributed parasitic light 17 is characterized by a scattering angle θ that is at least as large as the beam divergence angle of the relatively high intensity light 15 propagating in the axial waveguide portion 12A.

Referring specifically to FIG. 1, with the requisite minimum scattering angle θ in place, the beam projection optics 30 can be structured to discriminate between the laterally distributed parasitic light and the relatively high intensity light so as to favor projection of relatively high intensity optical signals towards the image field 40 of the laser projection system 10. More specifically, in the illustrated example, the beam projection optics 30 are structured to discriminate between the laterally distributed parasitic light 17 and the relatively high intensity light 15 through selective reflection of the projected relatively high intensity light 15. In the embodiment illustrated in FIG. 1, the beam projection optics 30 comprises a scanning mirror 34 that is sized and positioned to favor reflection of the relatively high intensity optical signals 15. Typically, the collimating lens 32 will be positioned far enough downstream of the output face of the wavelength conversion device 10 to ensure that collimated portions of the laterally distributed parasitic light 17 cannot be reflected by the scanning mirror 34. It is contemplated that the size and position of the scanning mirror 34 could be such that only the relatively high intensity optical signals are reflected by the scanning mirror 34, although some degree of crossover in the reflection of the parasitic light and the high intensity light could be tolerated.

Figure 7:
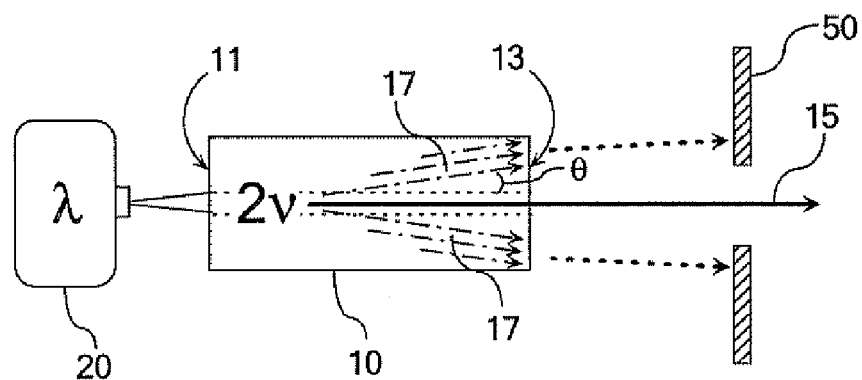
FIGS. 7 and 8 are schematic illustration of alternative configurations for favoring projection of relatively high intensity optical signals towards an image field of a laser projection system.
Figure 8:
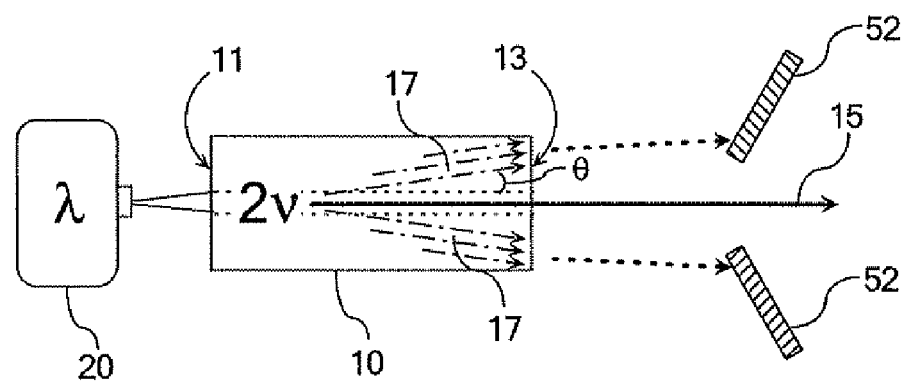

Alternatively, as is illustrated in FIG. 7, by introducing a transmission aperture 50, the projection optics 30 can be structured to discriminate between the laterally distributed parasitic light 17 and the relatively high intensity light 15 through selective transmission of the high intensity light 15. Similarly, as is illustrated in FIG. 8, by introducing diverting reflectors/absorbers 52, the projection optics 30 can be structured to discriminate between the laterally distributed parasitic light 17 and the relatively high intensity light 15 through selective reflection or absorption of the projected parasitic light 17.

Figure 3:
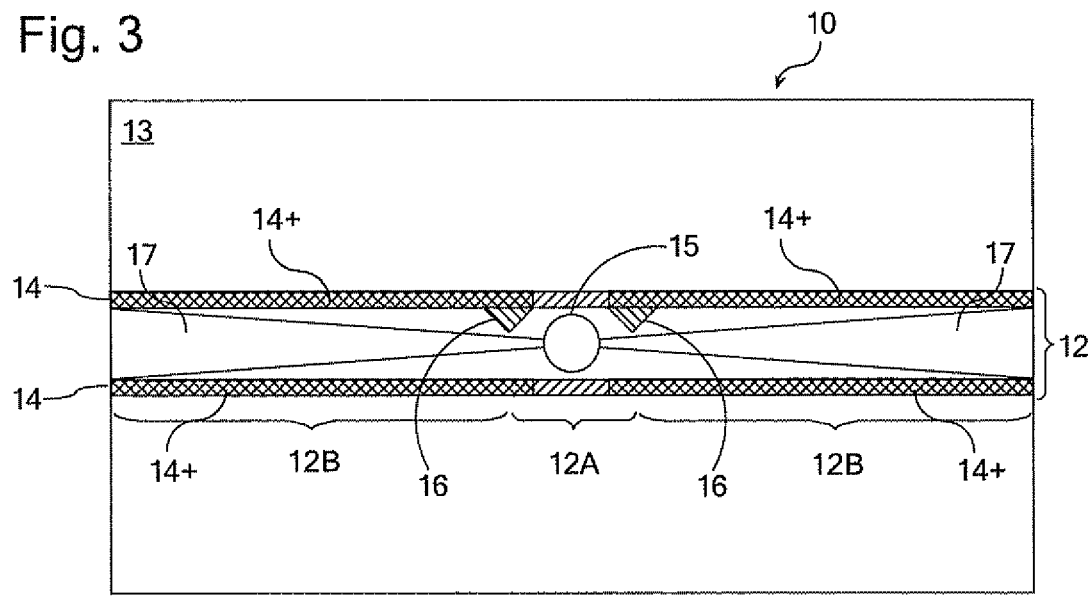
Figure 4:
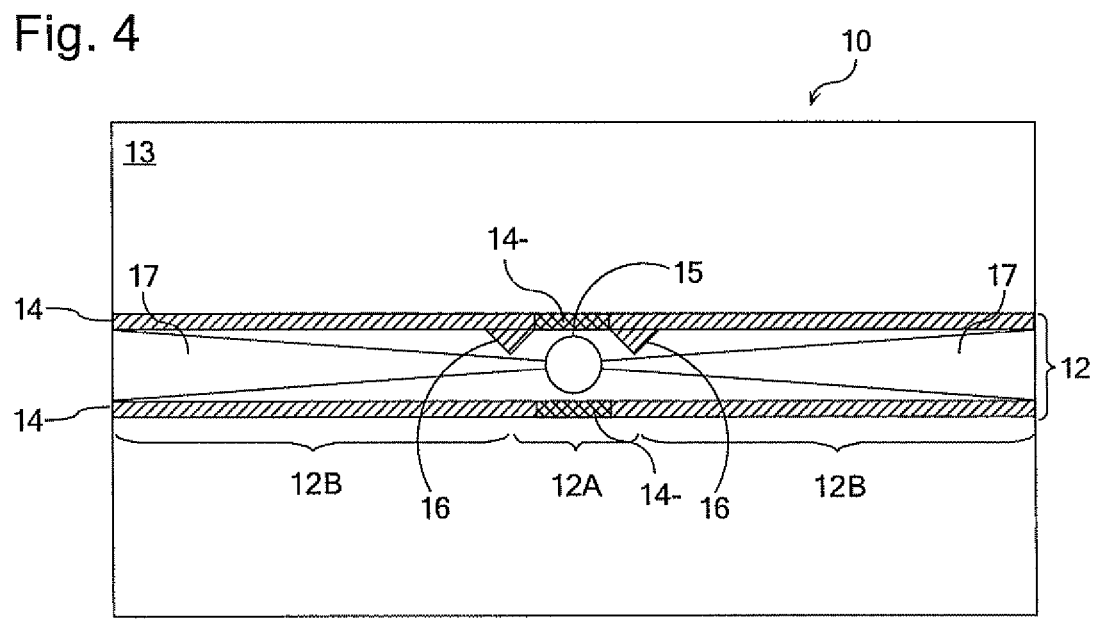
Figure 5:
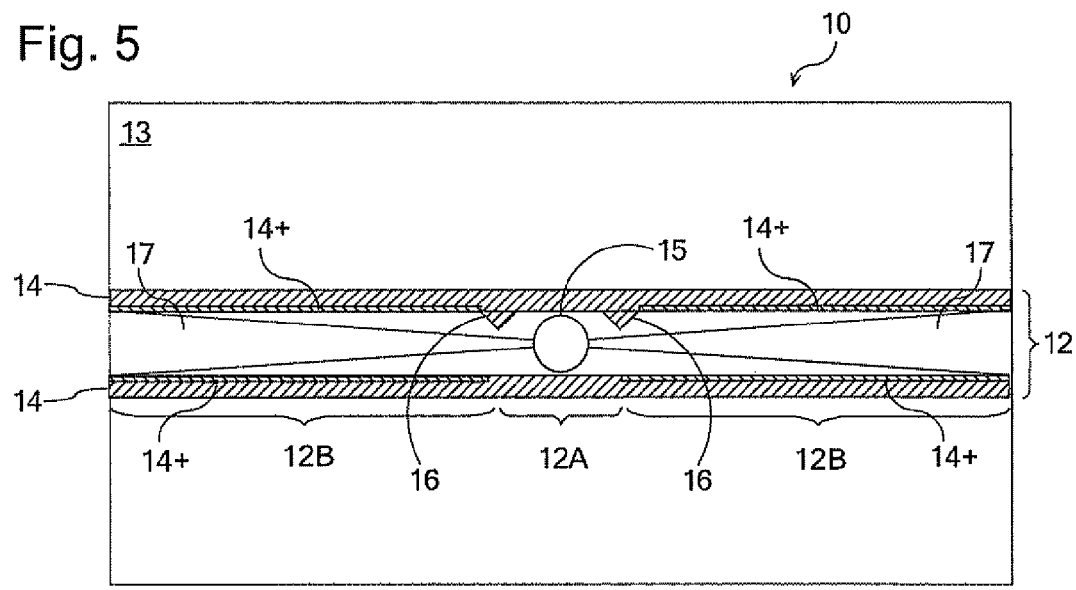
Figure 6:
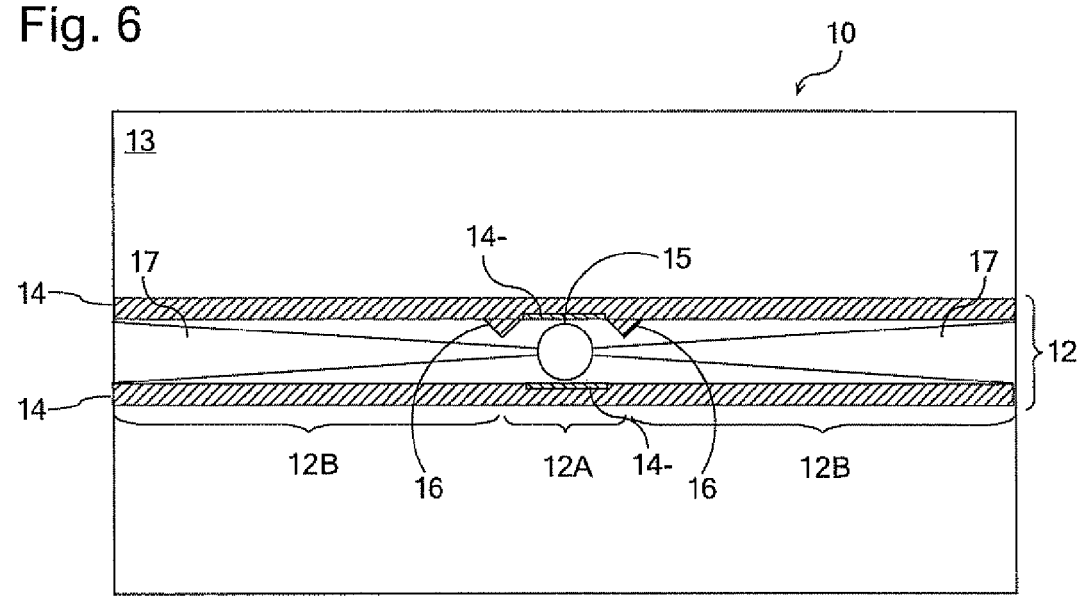

Referring specifically to FIGS. 2 and 3, to help ensure that the scattering angle θ is at least as large as the beam divergence angle of the relatively high intensity light 15 propagating in the axial waveguide portion 12A, the upper and/or lower cladding layers 14 can be configured to comprise at least one modified refractive index portion 14+ that is positioned in more direct optical communication with the pair of lateral planar waveguide portions 12B than the axial waveguide portion 12A. In this manner, the modified refractive index portion 14+ will increase the effective index of refraction $n_{EFF}(B)$ in the lateral planar waveguide portions 12B, as compared to the case where the relatively low index cladding layers 12 do not comprise the modified refractive index portion 14+. Alternatively, referring to FIG. 4, the upper and/or lower cladding layers 14 may comprise at least one modified refractive index portion 14− that is positioned in more direct optical communication with the axial waveguide portion 12A than the pair of lateral planar waveguide portions 12B. In this manner, the modified refractive index portion 14− will decrease the effective index of refraction $n_{EFF}(A)$ in the axial waveguide portion 12A. A further alternative is illustrated in FIGS. 5 and 6, where the modified refractive index portions 14+, 14− comprise coating formed on the waveguide region 12.

In each of the above-described cases, where the scattering angle θ is given as $$\cos \Theta = n_{EFF}(A)/n_{EFF}(B).$$

the effective index of refraction $n_{EFF}(A)$ in the axial waveguide portion 12A and the effective index of refraction $n_{EFF}(B)$ in the lateral planar waveguide portions 12B can be tailored such that the scattering angle θ is at least as large as the beam divergence angle of the relatively high intensity light 15. In practicing the present invention, in many cases, it will not be difficult to ensure that the scattering angle θ is at least about _3.8 degrees, or in some cases, greater than 4 degrees, or that the effective indices of refraction $n_{EFF}(A)$ and $n_{EFF}(B)$ are established such that $$\Delta n = n_{EFF}(B) - n_{EFF}(A) \geq 0.005.$$

It is also noted that terms like "preferably," "commonly," and "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation, e.g., "substantially above zero," varies from a stated reference, e.g., "zero," and should be interpreted to require that the quantitative representation varies from the stated reference by a readily discernable amount.

It is also noted that recitations herein of a component of the present invention being "structured" or "configured" in a particular way, to embody a particular property, or function in a particular manner, are structural recitations as opposed to recitations of intended use. More specifically, the references herein to the manner in which a component is "structured" or "configured" denote an existing physical condition of the component and, as such, are to be taken as a definite recitation of the structural characteristics of the component.

It is to be understood that the preceding detailed description of the invention is intended to provide an overview or framework for understanding the nature and character of the invention as it is claimed. It will he apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. A laser projection system comprising a laser source, a wavelength conversion device, and beam projection optics, wherein:
   the wavelength conversion device comprises an input face, an output face, and a waveguide region extending from the input face to the output face;
   the waveguide region comprises an axial waveguide portion and a pair of lateral planar waveguide portions confined between a pair of cladding layers;
   the waveguide region is structured such that an optical signal propagating from the input face to the output face along the waveguide region will define relatively high intensity light propagating in the axial waveguide portion and will be subject to a degree of scattering to define relatively low intensity laterally distributed parasitic light propagating in the lateral planar waveguide portions;
   the effective index of refraction $n_{EFF}(A)$ in the axial waveguide portion of the waveguide region, and the effective index of refraction $n_{EFF}(B)$ in the lateral planar waveguide portions of the waveguide region are established such that the relatively low intensity laterally distributed parasitic light is characterized by a scattering angle $\theta$ that is at least as large as the beam divergence angle of the relatively high intensity light propagating in the axial waveguide portion; and
   the beam projection optics are structured to discriminate between the laterally distributed parasitic light and the relatively high intensity light by discriminating against light emitted from the output face of the wavelength conversion device at angles larger than the divergence of the relatively high intensity light.

2. A laser projection system as claimed in claim 1 wherein at least one of the pair of cladding layers comprises at least one modified refractive index portion configured to decrease the following ratio, as compared to a pair of relatively low index cladding layers not comprising the modified refractive index portion:

$$n_{EFF}(A)/n_{EFF}(B).$$

3. A laser projection system as claimed in claim 2 wherein:
   the index of refraction of the modified refractive index portion is high, relative to a remaining portion of the pair of cladding layers; and
   the modified refractive index portion is positioned in more direct optical communication with the pair of lateral planar waveguide portions than the axial waveguide portion.

4. A laser projection system as claimed in claim 2 wherein:
   the index of refraction of the modified refractive index portion is low, relative to a remaining portion of the pair of relatively low index cladding layers; and
   the modified refractive index portion is positioned in more direct optical communication with the axial waveguide portion than the pair of lateral planar waveguide portions.

5. A laser projection system as claimed in claim 2 wherein an upper layer, a lower layer, or the upper and lower layers of the pair of relatively low index cladding layers comprises the modified refractive index portion.

6. A laser projection system as claimed in claim 2 wherein the modified refractive index portion comprises a coating formed on the waveguide region.

7. A laser projection system as claimed in claim 1 wherein the effective index of refraction $n_{EFF}(A)$ in the axial waveguide portion of the waveguide region and the effective index of refraction $n_{EFF}(B)$ in the lateral planar waveguide portions of the waveguide region are established such that the scattering angle $\theta$ is at least about 3 degrees in air.

8. A laser projection system as claimed in claim 7 wherein the scattering angle $\theta$ is given as $$\cos\theta = n_{EFF}(A)/n_{EFF}(B).$$

9. A laser projection system as claimed in claim 1 wherein the effective index of refraction $n_{EFF}(A)$ in the axial waveguide portion of the waveguide region and the effective index of refraction $n_{EFF}(B)$ in the lateral planar waveguide portions of the waveguide region are established such that $$\Delta n = n_{EFF}(B) - n_{EFF}(A) \geq 0.005.$$

10. A laser projection system as claimed in claim 1 wherein the waveguide region comprises a layer of second harmonic generating material sandwiched between a pair of cladding layers and one of the pair of cladding layers extends into a pair of optical trenches disposed on opposite sides of the axial waveguide portion.

11. A laser projection system as claimed in claim 1 wherein the waveguide region comprises a layer of second harmonic generating material sandwiched between a pair of cladding layers and the layer of second harmonic generating material and the pair of cladding layers extend laterally so as to span the axial waveguide portion and the pair of lateral planar waveguide portions.

12. A laser projection system as claimed in claim 1 wherein the waveguide region comprises a layer of second harmonic generating material sandwiched between a pair of cladding layers and the layer of second harmonic generating material and the pair of cladding layers extend laterally so as to span substantially an entire width of the wavelength conversion device.

13. A laser projection system as claimed in claim 1 wherein the waveguide region comprises a layer of second harmonic generating material sandwiched between a pair of cladding layers and the layer of second harmonic generating material has a thickness along its central axis of between approximately 2 μm and approximately 5 μm.

14. A laser projection system as claimed in claim 13 wherein the layer of second harmonic generating material extends at least approximately 3 μm to approximately 10 μm laterally into each of the pair of lateral planar waveguide portions.

15. A laser projection system as claimed in claim 1 wherein the axial waveguide portion is partially separated from the pair of lateral planar waveguide portions by optical trenches disposed on opposite sides of the axial waveguide portion.

16. A laser projection system as claimed in claim 15 wherein:
   the waveguide region comprises a layer of second harmonic generating material sandwiched between a pair of cladding layers;
   the layer of second harmonic generating material has a thickness dimension of between approximately 2 μm and approximately 5 μm and extends at least approximately 3 μm to approximately 10 μm laterally into each of the pair of lateral planar waveguide portions; and
   the optical trenches define the width of the axial waveguide portion.

17. A laser projection system as claimed in claim 16 wherein the optical trenches extend at least about 50% or about 2 μm into the thickness dimension of the second harmonic generating material.

* * * * *